US012036656B2

(12) United States Patent
Pei

(10) Patent No.: US 12,036,656 B2
(45) Date of Patent: Jul. 16, 2024

(54) POWER TOOL

(71) Applicant: Nanjing Chervon Industry Co., Ltd., Nanjing (CN)

(72) Inventor: Qingqing Pei, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 17/722,878

(22) Filed: Apr. 18, 2022

(65) Prior Publication Data

US 2023/0009624 A1 Jan. 12, 2023

(30) Foreign Application Priority Data

Jul. 6, 2021 (CN) ......................... 202110760635.1

(51) Int. Cl.

| | |
|---|---|
| ***B25F 5/02*** | (2006.01) |
| ***F21V 11/16*** | (2006.01) |
| ***F21V 23/04*** | (2006.01) |
| ***F21V 33/00*** | (2006.01) |
| ***F21Y 103/10*** | (2016.01) |
| ***F21Y 115/10*** | (2016.01) |

(52) U.S. Cl.

CPC ................ *B25F 5/02* (2013.01); *F21V 11/16* (2013.01); *F21V 23/04* (2013.01); *F21V 33/008* (2013.01); *F21V 33/0084* (2013.01); *F21Y 2103/10* (2016.08); *F21Y 2115/10* (2016.08)

(58) Field of Classification Search

CPC ............. F21V 33/0089; F21V 33/0084; F21V 33/008; F21V 33/0044; B25F 5/02

See application file for complete search history.

(56) References Cited

U.S. PATENT DOCUMENTS

| | | | | |
|---|---|---|---|---|
| 5,169,225 | A * | 12/1992 | Palm | B25F 5/021 362/118 |
| 6,575,590 | B1 | 6/2003 | Wadsworth | |
| 9,242,355 | B2 * | 1/2016 | Sergyeyenko | B25F 5/00 |
| 9,328,915 | B2 * | 5/2016 | Vanko | B25F 5/021 |
| 9,573,257 | B2 * | 2/2017 | Kynast | H05B 47/115 |
| 11,525,569 | B2 * | 12/2022 | Jacobson | F21V 33/006 |
| 11,835,217 | B2 * | 12/2023 | Friedman | F21V 33/0084 |

(Continued)

FOREIGN PATENT DOCUMENTS

| | | | |
|---|---|---|---|
| CN | 206605460 | U | 11/2017 |
| JP | 1044064 | A | 2/1998 |

*Primary Examiner* — William N Harris

(74) *Attorney, Agent, or Firm* — Greenberg Traurig, LLP

(57) ABSTRACT

A power tool includes an output assembly, a housing, and an illumination device. The housing includes a main body, a grip, and a power supply connection portion. The power supply connection portion is configured to connect a power supply device. The main body and the power supply connection portion are respectively disposed at two ends of the grip. The illumination device is mounted to the power supply connection portion and includes a light-emitting element and a shield covering the light-emitting element. The shield has a light emission surface allowing light to be emitted therethrough. The power tool has a central plane, and a ratio of a size of the light emission surface in a width direction perpendicular to the central plane to a size of the power supply connection portion in the width direction is greater than or equal to 0.5 and less than or equal to 1.

20 Claims, 7 Drawing Sheets

(56) References Cited

U.S. PATENT DOCUMENTS

| | | | | |
|---|---|---|---|---|
| 2004/0174699 | A1* | 9/2004 | Minalga | B25B 23/18 362/119 |
| 2005/0135084 | A1 | 6/2005 | Chen et al. | |
| 2010/0027246 | A1* | 2/2010 | Petersen | F21V 33/0084 362/119 |
| 2016/0354905 | A1* | 12/2016 | Ely | B25B 21/02 |
| 2018/0274778 | A1* | 9/2018 | Fulkerson | F21V 17/002 |
| 2023/0364770 | A1* | 11/2023 | Elder | B25F 5/02 |

* cited by examiner

POWER TOOL

RELATED APPLICATION INFORMATION

This application claims the benefit under 35 U.S.C. § 119(a) of Chinese Patent Application No. CN 202110760635.1, filed on Jul. 6, 2021, which application is incorporated herein by reference in its entirety.

BACKGROUND

Some conventional power tools are equipped with illumination devices configured to illuminate working environments so as to assist users in operating the power tools. The illumination device of an existing power tool has the problem that a light-emitting element has insufficient brightness, thereby affecting the operation accuracy of a user and being not conducive to improving the user experience of the power tool.

SUMMARY

A power tool includes an output assembly, a housing, a power device, and an illumination device. The output assembly is capable of providing output. The housing supports the output assembly. The power device is configured to drive the output assembly. The housing includes a main body, a grip, and a power supply connection portion. The main body is configured to support the output assembly. The grip is configured to be gripped by a user. The power supply connection portion is configured to connect a power supply device. The main body and the power supply connection portion are respectively disposed at two ends of the grip. The illumination device is used for illumination. The illumination device is mounted to the power supply connection portion and includes a shield and a light source assembly. The light source assembly includes at least one light-emitting element disposed in the shield, where the shield has a light emission surface allowing light to be emitted through. The power tool has a central plane, and a ratio of a size of the light emission surface in a width direction perpendicular to the central plane to a size of the power supply connection portion in the width direction is greater than or equal to 0.5 and less than or equal to 1.

In one example, a distance between two light-emitting elements which are farthest from each other is greater than or equal to 12 mm and less than or equal to 50 mm.

In one example, the housing includes the grip and the power supply connection portion. The grip is connected to the power supply connection portion and configured to be gripped. The power supply connection portion is capable of connecting the power supply device. The illumination device is disposed at a front end of the power supply connection portion.

In one example, the power tool includes a trigger configured to control the power device and the illumination device to be turned on.

In one example, the power tool includes a trigger and an illumination switch, the trigger controls the power device to be turned on, and the illumination switch controls the illumination device to operate.

In one example, the illumination switch is disposed at the front end of the power supply connection portion.

In one example, the power tool further includes a control board, the illumination device and the power device are communicatively connected to the control board, the control board is disposed in the power supply connection portion or disposed between the power supply connection portion and the grip.

In one example, the illumination device forms the light emission surface, and an area of the light emission surface is larger than or equal to 35 square millimeters and smaller than or equal to 145 square millimeters.

In one example, the illumination device is an elongated light strip.

In one example, the housing further includes a head housing, and the illumination device is disposed on the grip or the head housing.

DETAILED DESCRIPTION

Figure 1:
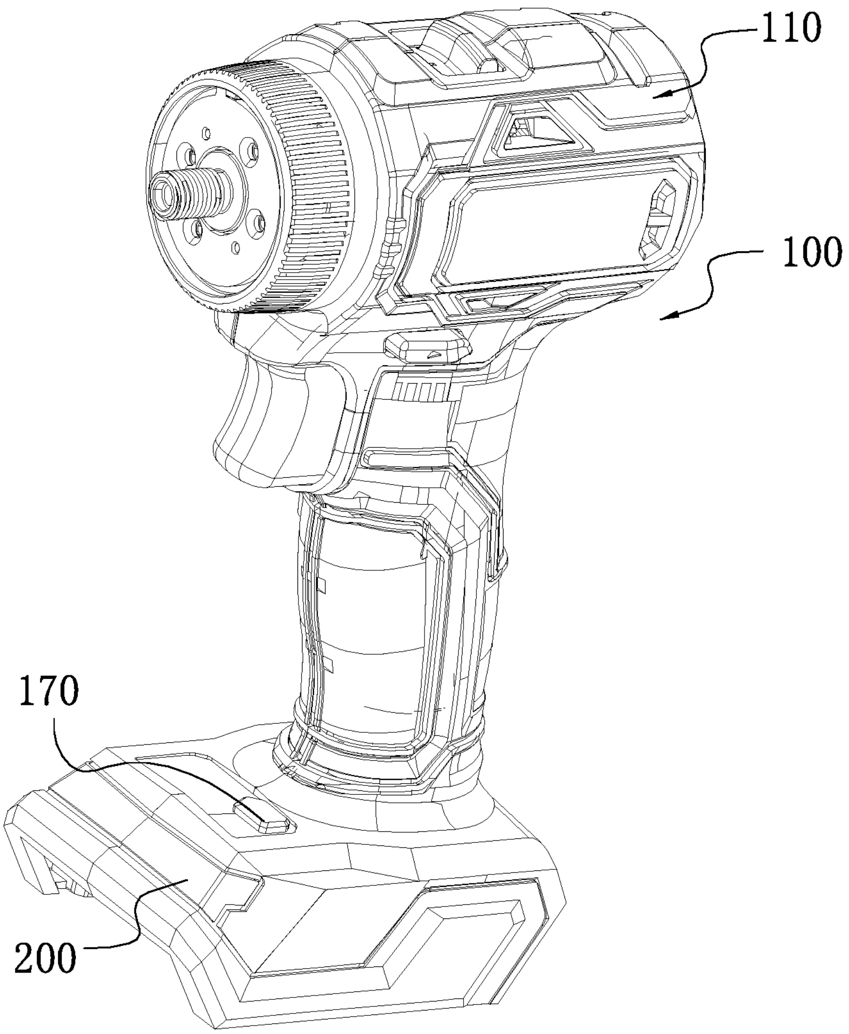
FIG. 1 is a perspective view of a power tool according to a first example.

Examples of the present disclosure are described below in detail with reference to the drawings. The same or similar reference numerals indicate the same or similar elements or elements having the same or similar functions. The examples described below with reference to the drawings are only intended to explain the present disclosure and are not to be construed as limiting the present disclosure.

FIG. 1 is a schematic view of a power tool 100 of the present disclosure. The power tool 100 is specifically a handheld power tool which may be an impact tool such as an impact screwdriver or an impact wrench or may be a rotary power tool such as an electric drill or an electric screwdriver.

Figure 2:
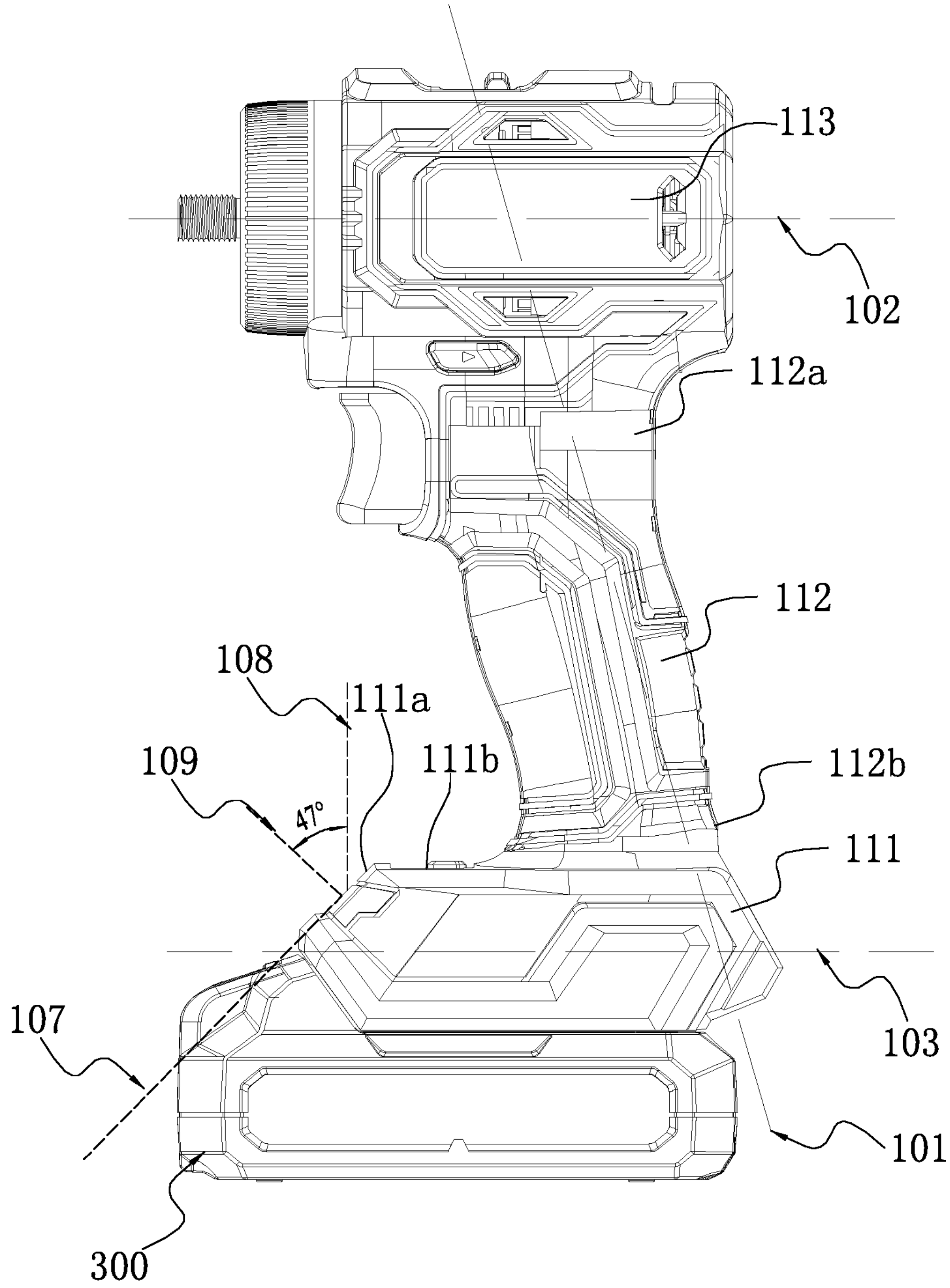
FIG. 2 is a plan view of the power tool in FIG. 1 with a power supply device mounted.
Figure 3:
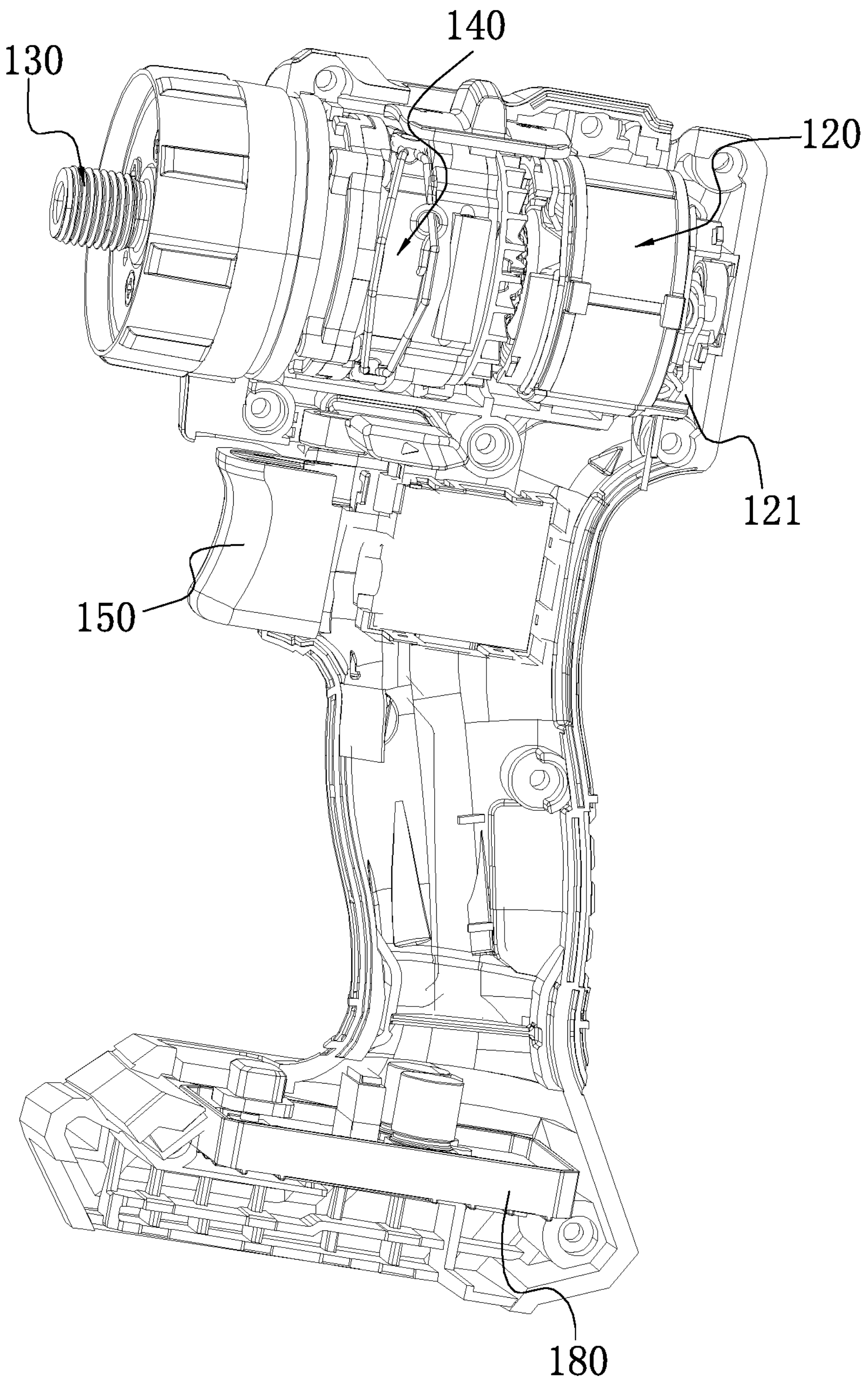
FIG. 3 is a schematic view of an internal structure of the power tool in FIG. 1.

Referring to FIGS. 1 to 3, the power tool 100 includes a housing 110, a power device 120, an output assembly 130, and a transmission assembly 140. The output assembly 130 is configured to output a driving force. The power device 120 is disposed in the housing 110 and may be a motor. The output assembly 130 is disposed at a front end of the housing 110. The power device 120 has a motor shaft which provides a rotational output. The power device 120 includes a stator and a rotor. The transmission assembly 140 is connected to the power device 120 and the output assembly 130 and configured to transmit power outputted by the power device 120 to the output assembly 130. Specifically, when the power tool 100 is an impact tool, the transmission assembly 140 decelerates the rotational movement of the motor shaft for output. Referring to FIG. 3, the output assembly 130 includes an impact force generation mechanism configured to generate an impact force.

The power tool 100 further includes a control board 180 electrically connected to the power device 120 and configured to control the power device 120 to output the driving force. The control board 180 is accommodated in the housing 110.

When the power tool 100 is a rotary power tool, the power device 120 is decelerated by the transmission assembly 140 to drive the output assembly 130 to rotate.

Referring to FIGS. 2 and 3, an accommodating cavity 121 is formed and surrounded by the housing 110. At least part of the power device 120 and part of the transmission assembly 140 are accommodated in the accommodating cavity 121. In this example, both the power device 120 and the transmission assembly 140 are accommodated in the accommodating cavity 121 formed by the housing 110 and disposed along an axial direction of the motor shaft of the power device 120. The transmission assembly 140 is connected to the power device 120 and disposed in the front of the housing 110 with respect to the power device 120. The power device 120 and the transmission assembly 140 form a coaxial rotation and of course, may also form a non-coaxial rotation.

The housing 110 further includes a main body 113, a grip 112, and a power supply connection portion 111. The main body 113 is configured to support the output assembly 130. The main body 113 and the power supply connection portion 111 are respectively disposed at two ends of the grip 112. The grip 112 is connected to the power supply connection portion 111. The grip 112 is gripped by a user. The power supply connection portion 111 is configured to connect a power supply device 300, so as to supply electricity to the power device 120.

The output assembly 130 is supported by the main body 113 and disposed at a front end of the power tool 100 with respect to the power device 120. The motor shaft of the power device 120 can rotate about a first axis, so as to drive the output assembly 130 to rotate about the first axis.

The power supply device 300 is configured to supply electricity to the power tool 100. In one example, the power tool 100 is powered by a direct current (DC) power supply. More specifically, the power tool 100 is powered by a battery pack. The battery pack cooperates with a corresponding power supply circuit to supply electricity to the power device 120 and circuit components on the control board 180. It is to be understood by those skilled in the art that the power supply is not limited to the battery pack, and various circuit elements may be powered through mains and an alternating current (AC) power supply in conjunction with corresponding rectifier circuits, filter circuits, and voltage regulation circuits.

In this example, the grip 112 has an extension direction 101. In the extension direction, the grip 112 has a first end 112*a* and a second end 112*b* at two ends. The main body 113 is disposed at the first end 112*a* of the grip 112 and extends substantially in the direction of a first straight line 102. The grip 112 extends obliquely with respect to the main body 113. The power supply connection portion 111 is disposed at the second end 112*b* of the grip 112 and extends substantially in the direction of a second straight line 103. The grip 112 extends obliquely with respect to the power supply connection portion 111.

The output assembly 130 is disposed at a front end of the main body 113, and the output assembly 130 can perform operation on a working region in front of the main body 113.

Figure 4A:
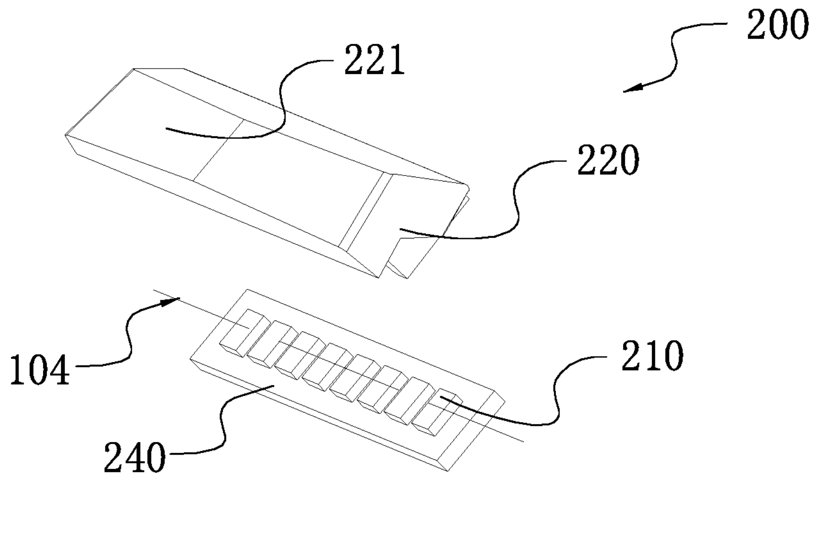
FIG. 4A is a perspective view of an illumination device of the power tool in FIG. 1.

Referring to FIGS. 3 and 4A, the power tool 100 further includes an illumination device 200 configured to illuminate a working environment of the power tool 100 to facilitate the operation of the power tool 100 by the user. The illumination device 200 can also particularly illuminate the working region in front of the main body 113 so that the user can more clearly observe a workpiece in the working region.

The illumination device 200 includes a light-emitting element 210 and a shield 220. The light-emitting element 210 is disposed in the shield 220, and the shield 220 is capable of condensing light from the light-emitting element 210. Multiple light-emitting elements 210 are provided and may be light-emitting diode (LED) lamp beads or chip-on-board (COB) lamp beads. The multiple light-emitting elements 210 are spaced so that the illumination device 200 forms a surface light-emitting element 211, has a wider illumination region, and can provide higher brightness. The number of light-emitting elements 210 is greater than 4. Alternatively, the number of light-emitting elements 210 is greater than 6. Specifically, in this example, the number of light-emitting elements 210 is 8. The multiple light-emitting elements 210 are sequentially arranged in the direction of a third straight line 104. In this example, the 8 light-emitting elements 210 are sequentially arranged in the direction of the third straight line 104. Thus, the multiple light-emitting elements 210 can form a relatively wide light strip.

Figure 4B:
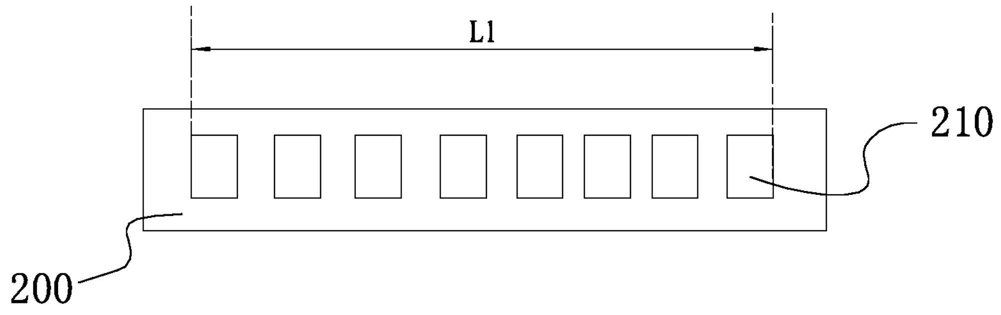
FIG. 4B is a plan view of the illumination device in FIG. 4A.
Figure 5:
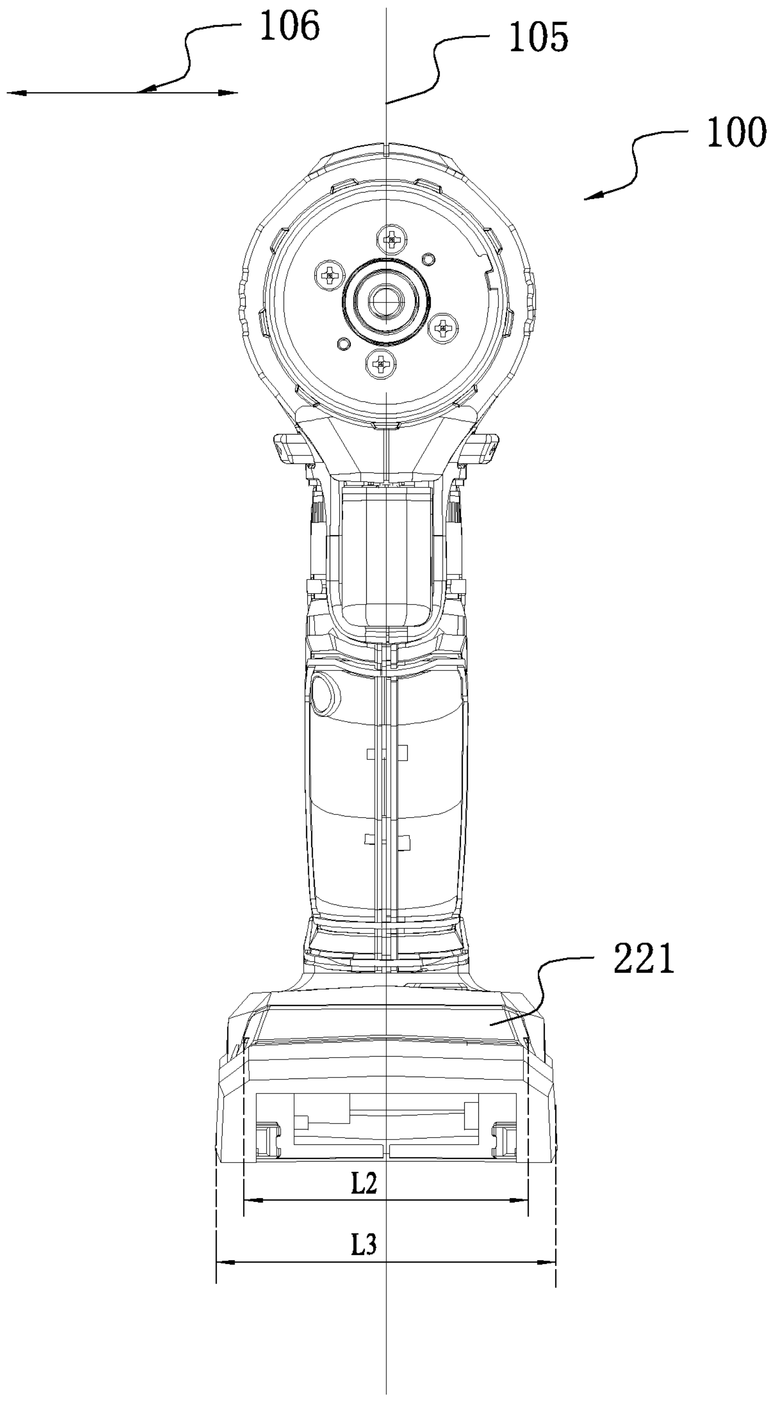
FIG. 5 is a front view of an illumination device of the power tool in FIG. 1.

As shown in FIG. 5, the power tool 100 has a central plane 105, and the power tool 100 is at least partially symmetrical about the central plane 105. The central plane 105 passes through a rotation axis of the output assembly 130. As shown in FIGS. 4A and 5, the shield 220 covers the light-emitting elements and has a light emission surface 221 allowing light to be emitted through. A ratio of a size L2 of the light emission surface 221 in a width direction 106 perpendicular to the central plane 105 to a size L3 of the power supply connection portion 111 in the width direction 106 is greater than or equal to 0.5 and less than or equal to 1. Alternatively, the ratio of the size L2 of the light emission surface 221 in the width direction 106 to the size of the power supply connection portion 111 in the width direction 106 is greater than or equal to 0.7 and less than or equal to 1. Alternatively, the ratio of the size L2 of the light emission surface 221 in the width direction 106 to the size of the power supply connection portion 111 in the width direction 106 is greater than or equal to 0.8 and less than or equal to 0.9 so that the light can be emitted through most of the surface of the power supply connection portion 111 from left to right. Referring to FIGS. 1 and 2, the illumination device 200 is disposed at a front end of the power supply connection portion 111 and configured to be an elongated light strip. The elongated light strip extends transversely at the front end of the power supply connection portion 111 and is configured to illuminate the working region in front of the power tool 100. In one example, referring to FIG. 4B, the light-emitting elements 210 are disposed in the shield 220, the multiple light-emitting elements 210 are evenly spaced in the shield 220 and sequentially arranged along the width direction 106. A distance L1 between two light-emitting elements 210 which are farthest from each other is greater than or equal to 12 mm and less than or equal to 50 mm so that the illumination device 200 has a higher lumen value. The distance L1 includes a distance between the two light-emitting elements 210 and sizes of the two light-emitting elements 210 themselves. Thus, the illumination device 200 in the shape of the light strip can provide the wider illumination region and the higher brightness. The illumination device 200 is disposed at the front end of the power supply connection portion 111. Here, it is defined that the output assembly 130 is disposed at a front end of the power device 120. The preceding structure of the illumination device 200 forms the light emission surface 221 whose area is larger than or equal to 35 square millimeters and smaller than or equal to 145 square millimeters. Thus, ambient brightness can be improved when the user uses the power tool 100, and the operation accuracy of the user using the power tool 100 is improved.

In one example, the power supply connection portion 111 includes a front end surface 111*a* and an upper end surface 111*b*, where the front end surface 111*a* extends obliquely with respect to the upper end surface 111*b*. The illumination device 200 has the same width as the front end surface 111*a* of the power supply connection portion 111 so that the illumination device 200 penetrates through the front end surface 111*a* of the power supply connection portion 111 in the width direction 106, and the light-emitting elements 210 are arranged transversely on the front end surface 111*a* of the power supply connection portion 111.

In other examples, the illumination device is disposed on a side surface of the grip or above the grip, or the illumination device is disposed on the main body. Specifically, the illumination device may be disposed at the front end, at a rear end, or on a side surface of the main body.

In one example, the power tool 100 includes a trigger 150 configured to control the power device 120 and the illumination device 200 to be turned on. The illumination device 200 and the power device 120 are communicatively connected to the control board 180. The control board 180 is disposed in the power supply connection portion 111 so that the power tool 100 has a compact internal structure. Alternatively, the control board 180 is disposed between the power supply connection portion 111 and the grip 112 and configured to control the operation of the power device 120 and the illumination device 200. In this example, the illumination device 200 includes a lamp plate 240 to which the multiple light-emitting elements 210 are mounted, and the lamp plate 240 is rectangular. The light-emitting elements 210 are electrically connected to the control board 180 through wires. The control board 180 is also electrically connected to the trigger 150 or the power device 120 through a wire.

The user presses the trigger 150 to send a signal to the control board 180 so as to turn on the power device 120. The control board 180 simultaneously controls the illumination device 200 to be turned on. When the trigger 150 is no longer pressed, the control board 180 controls the power device 120 to stop rotating and controls the illumination device 200 to be turned off. An algorithm may be disposed in the control board 180 so that the illumination device 200 is off after a first preset time when the power device 120 stops rotating. For example, the control board 180 is disposed so that the illumination device 200 is off after 15 seconds when the power device 120 stops rotating. Here, that the power device 120 stops rotating refers to that the power device 120 stops operating when the trigger 150 is closed.

The power tool 100 further includes an illumination switch 170, the trigger 150 controls the power device 120 to be turned off, and the illumination switch 170 controls the illumination device 200 to operate. The illumination switch 170 is connected to the control board 180. The illumination switch 170 is configured to adjust brightness and an operation mode of the illumination device 200. The illumination switch 170 may control the illumination device 200 to switch to a high brightness mode and a low brightness mode. It is to be understood that in other examples, a medium brightness mode may also be set between the high brightness mode and the low brightness mode. In other examples, the illumination switch may also control the illumination device to be turned on or off. For example, the illumination device is controlled to be turned off after N seconds when the power device stops rotating, or the illumination device is switched to an always on mode. The illumination switch 170 is disposed on the upper end surface of the power supply connection portion 111 and the control board 180 is disposed in the power supply connection portion 111 so that the illumination switch 170, the illumination device 200, and the control board 180 are arranged compactly to facilitate wire arrangement. The illumination switch 170 is also disposed between the illumination device 200 and the grip 112.

In this example, the illumination device 200 has a first brightness mode and a second brightness mode. The brightness of the illumination device 200 in the second brightness mode is higher than the brightness of the illumination device 200 in the first brightness mode. In this example, the first brightness mode is the low brightness mode, and the second brightness mode is the high brightness mode. It is to be understood that the illumination device 200 may also have a third brightness mode. The brightness of the illumination device 200 in the third brightness mode may be lower than the brightness of the illumination device 200 in the second brightness mode or higher than the brightness of the illumination device 200 in the second brightness mode.

When the power tool 100 is turned on through the trigger, the control board 180 controls the illumination device 200 to be turned on and in the first brightness mode (that is, the low brightness mode). When the illumination device 200 is in the first brightness mode, if the illumination switch 170 is not operated to switch a mode of the illumination device 200 within the first preset time, the control board 180 controls the illumination device 200 to be turned off after illuminating for the first preset time. When the illumination device 200 is in the first brightness mode, if the illumination switch 170 is operated to switch the mode of the illumination device 200 within the first preset time, the control board 180 controls the illumination device 200 to switch to the second brightness mode (that is, the high brightness mode). The control board 180 may also control the illumination device 200 to be turned off after being in the second brightness mode for a second preset time.

In other examples, the illumination device and the power device are independent of each other. The illumination switch separately controls the illumination device to be turned on. The user presses the trigger to send the signal to the control board so as to turn on the power device. The user needs to press the illumination switch to separately control the illumination device to be turned on.

The light emission surface 221 is inclined upward and forward. Here, the output assembly 130 is disposed in front of the whole machine and relatively above the power supply connection portion 111. An extension plane 107 of at least part of the light emission surface 221 intersects obliquely with a vertical direction 108. The light emission surface 211 has a light emission direction 109 perpendicular to the extension plane 107. The light emission direction 109 of the light emission surface 211 intersects obliquely with the vertical direction 108 at an angle greater than or equal to 40 degrees and less than or equal to 60 degrees. For example, in this example, the light emission direction 109 of the light emission surface 211 intersects obliquely with the vertical direction 108 at an angle of 47 degrees.

In one example, both the illumination switch 170 and the illumination device 200 are disposed on the power supply connection portion 111. A linear distance between the illumination switch 170 and the illumination device 200 is less than or equal to 40 mm, thereby facilitating the control of the illumination switch 170 by the user and the arrangement of wires in the power tool 100.

The illumination device 200 further includes a plurality of color temperature modes. The multiple light-emitting elements 210 can be divided into at least two different color temperature types. The color temperature change of illumination device 200 is realized by turning on the light-emitting elements 210 of the different color temperature types or different number of the light-emitting elements 210. Specifically, the illumination device 200 includes a high color temperature mode and a low color temperature mode. In other examples, a medium color temperature mode is set between the high color temperature mode and the low color temperature mode. The light color of the illumination device 200 in the high color temperature mode is blue and white, and the light color of the illumination device 200 in the low color temperature mode is yellow.

In this example, the illumination device 200 has a first color temperature mode and a second color temperature mode. The color temperature of the illumination device 200 in the second color temperature mode is higher than the color temperature of the illumination device 200 in the first color temperature mode. In this example, the first color temperature mode is the low color temperature mode, and the second color temperature mode is the high color temperature mode. The illumination device 200 further includes a third color temperature mode. The color temperature of the illumination device 200 in the third color temperature mode is lower than the color temperature of the illumination device 200 in the second color temperature mode or higher than the color temperature of the illumination device 200 in the second color temperature mode.

The illumination switch 170 controls the illumination device 200 to switch to the first color temperature mode and the second color temperature mode. The user presses the trigger 150 to send a signal to the control board 180 so as to turn on the power device 120. The control board 180 simultaneously controls the illumination device 200 to be turned on. When the trigger 150 is no longer pressed, the control board 180 controls the power device 120 to stop rotating and controls the illumination device 200 to be turned off. An algorithm may be disposed in the control board 180 to identify whether the user's operation purpose is to switch the brightness mode or the color temperature mode by detecting the user's operation of the lighting switch 170 Specifically, the operation purpose is identified by the length of time that the user presses the illumination switch 170, or the manner in which the user presses the illumination switch 170 as a double click or a single click, and the like.

In other examples, the power tool 100 further includes a mode switch. The mode switch is connected to the control board 180. An algorithm may be disposed in the control board 180 so that the power tool 100 includes a plurality of preset operating modes. For example, a first operating mode for the power tool 100 is for the power tool 100 to perform woodworking screw operation, and a second operating mode for power tool 100 is for the power tool 100 to perform tapping screw operation. The power tool 100 switches to the first operating mode and the second operating mode by switching mode switch. It is to be understood that power tool 100 further includes a third operating mode for other specific work scenarios.

When the user operates the mode switch to a position of the first operating mode, the control board 180 controls the power tool 100 to work in a preset mode corresponding to the first operating mode, and control board 180 controls the illumination device 200 to work in the first color temperature mode (i.e., low color temperature mode). When the user operates the mode switch to a position of the second operating mode, the control board 180 controls the power tool 100 to work in a preset mode corresponding to the second operating mode, and control board 180 controls the illumination device 200 to work in the second color temperature mode (i.e., high color temperature mode).

In other examples, the power tool 100 can be switched by other devices, such as sensor or other recognition devices. The control board 180 matches different color temperature modes of illumination device 200 according to the operating mode of power tool 100.

Figure 6:
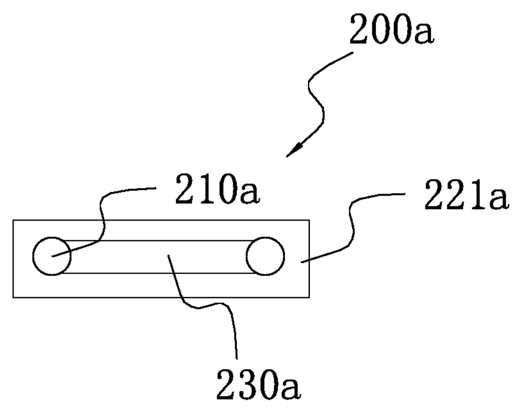
FIG. 6 is a plan view of an illumination device of a power tool according to a second example.
Figure 7:
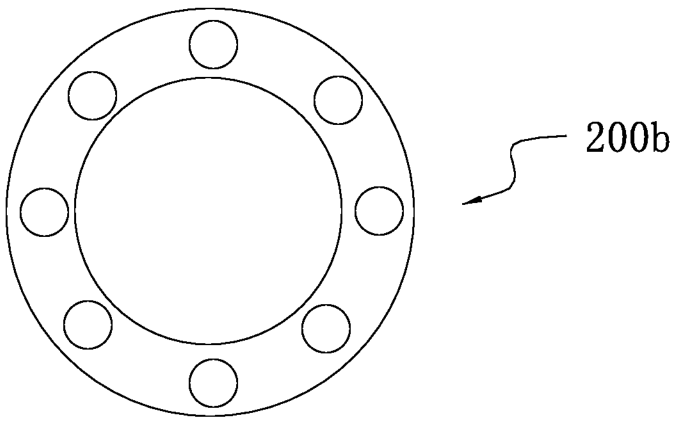
FIG. 7 is a plan view of an illumination device of a power tool according to a third example.
Figure 8:
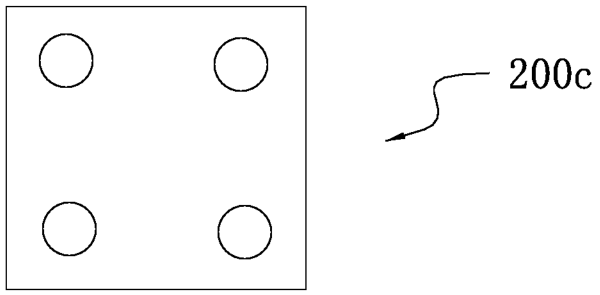
FIG. 8 is a plan view of an illumination device of a power tool according to a fourth example.

FIG. 6 is a plan view of an illumination device **200*a* in a power tool according to a second example. In this example, the illumination device 200*a* further includes a light guide member 230*a* disposed between light-emitting elements 210*a*. At least two light-emitting elements 210*a* are respectively disposed at two ends of the light guide member 230*a* and configured to guide light emitted by the light-emitting elements 210*a* so that the illumination device 200*a* forms a surface light-emitting element. The light guide member 230*a* has a certain size so that a distance between two light-emitting elements 210*a* which are farthest from each other is greater than or equal to 12 mm and less than or equal to 50 mm. Thus, the illumination device 200*a*** in the shape of a light strip can provide a wider illumination region and higher brightness.

In one example, the distance between the two light-emitting elements **210*a* which are farthest from each other is greater than or equal to 20 mm and less than or equal to 40 mm, and an area of a light emission surface 221*a*** may be larger than or equal to 40 square millimeters.

In one example, the area of the light emission surface **221*a* is larger than or equal to 35 square millimeters and smaller than or equal to 80 square millimeters so as to reduce an effect of the illumination device 200*a*** on the size of the power tool.

In one example, the light-emitting elements 210 may be arranged in a ring in addition to the strip. The light-emitting elements 210 arranged in the ring form a circular illumination device **200*b*. The light-emitting elements 210 may also be arranged in a rectangle to form a rectangular illumination device 200*c* or arranged in another manner, and the area of the light emission surface 221** may be larger than or equal to 35 square millimeters, thereby increasing the illumination range and intensity in lumens of the illumination device.

The preceding examples illustrate only the basic principles and features of the present disclosure. The present disclosure is not limited to the preceding examples. Various modifications and variations made without departing from the spirit and scope of the present disclosure fall within the scope of the present disclosure. The scope of the present disclosure is defined by the appended claims and their equivalents

What is claimed is:

1. A power tool, comprising:

an output assembly configured to output power;

a housing supporting the output assembly;

a power device configured to drive the output assembly; and an illumination device used for illumination, wherein the housing comprises a main body configured to support the output assembly, a grip configured to be gripped by a user, and a power supply connection portion configured to connect a power supply device, wherein the main body and the power supply connection portion are respectively disposed at two ends of the grip, the illumination device is mounted to the power supply connection portion and comprises a light-emitting element and a shield covering the light-emitting element, the shield has a first light emission surface allowing light to be emitted therethrough, the power tool has a central plane, and a ratio of a size of the first light emission surface in a width direction perpendicular to the central plane to a size of the power supply connection portion in the width direction is greater than or equal to 0.7 and less than or equal to 1, and the shield further comprises a second light emission surface and a third light emission surface, the second light emission surface extends from a first end of the first light emission surface and the third light emission surface extends from a second end of the first light emission surface, and a first angle between the first light emission surface and the second light emission surface is non-linear, and a second angle between the first light emission surface and the third light emission surface is non-linear.

2. The power tool according to claim 1, wherein a plurality of light-emitting elements are provided and a distance between two light-emitting elements which are farthest from each other is greater than or equal to 12 mm and less than or equal to 50 mm.

3. The power tool according to claim 1, comprising a trigger configured to control the power device and the illumination device to be turned on.

4. The power tool according to claim 1, comprising a trigger and an illumination switch, wherein the trigger controls the power device to be turned on and the illumination switch controls the illumination device to operate.

5. The power tool according to claim 4, wherein the illumination switch is disposed at the power supply connection portion.

6. The power tool according to claim 5, wherein the illumination switch is disposed between the illumination device and the grip.

7. The power tool according to claim 5, wherein the power supply connection portion comprises a front end surface and an upper end surface, the front end surface is oblique with respect to the upper end surface, the illumination device is disposed on the front end surface, and the illumination switch is disposed on the upper end surface.

8. The power tool according to claim 3, further comprising a control board, wherein the illumination device and the power device are communicatively or electrically connected to the control board and the control board is disposed in the power supply connection portion or disposed between the power supply connection portion and the grip.

9. The power tool according to claim 1, wherein an area of the first light emission surface is larger than or equal to 35 square millimeters and smaller than or equal to 145 square millimeters.

10. The power tool according to claim 9, wherein the illumination device is an elongated light strip.

11. The power tool according to claim 1, wherein the first light emission surface is inclined upward and forward.

12. The power tool according to claim 1, wherein the power supply connection portion comprises a front end surface and an upper end surface, the front end surface is oblique with respect to the upper end surface, and the illumination device is disposed on the front end surface.

13. The power tool according to claim 1, wherein the power tool is a rotary tool.

14. The power tool according to claim 1, wherein the power tool is an impact tool.

15. A power tool, comprising:

an output assembly configured to output power;

a housing supporting the output assembly;

a power device configured to drive the output assembly; and an illumination device used for illumination, wherein the housing comprises a power supply connection portion configured to connect a power supply device, the illumination device is mounted to the power supply connection portion and extends over a portion of each of a left side and a right side of the power supply connection portion, the illumination device comprises a light-emitting element and a shield covering the light-emitting element, the shield has a light emission surface allowing light to be emitted therethrough, and a ratio of a size of the light emission surface in a width direction to a size of the power supply connection portion in the width direction is greater than or equal to 0.8 and less than or equal to 0.9, and the light emitting element comprises a plurality of chip-on-board light emitting diodes sequentially arranged in the direction of an elongated longitudinal axis of the illumination device.

16. A power tool, comprising:

an output assembly configured to output power;

a housing supporting the output assembly;

a power device configured to drive the output assembly; and an illumination device used for illumination, wherein the housing comprises a main body configured to support the output assembly, a grip configured to be gripped by a user, and a power supply connection portion configured to connect a power supply device, wherein the main body and the power supply connection portion are respectively disposed at two ends of the grip, the illumination device is mounted to the power supply connection portion and extends over a portion of each of a left side and a right side of the power supply connection portion, the illumination device comprises a plurality of light-emitting elements and the plurality of light-emitting elements are a plurality of chip-on-board light emitting diodes sequentially arranged on a surface of the illumination device, the power tool has a central plane, and in a width direction perpendicular to the central plane, a distance L1 between two light-emitting elements which are farthest from each other is greater than or equal to 12 mm and less than or equal to 50 mm, and a shield covering the plurality of light-emitting elements, the shield has a first light emission surface allowing light to be emitted therethrough, the shield further comprises a second light emission surface and a third light emission surface, the second light emission surface extends from a first end of the first light emission surface and the third light emission surface extends from a second end of the first light emission surface, and a first angle between the first light emission surface and the second light emission surface is non-linear, and a second angle between the first light emission surface and the third light emission surface is non-linear.

17. The power tool according to claim 16, wherein the power supply connection portion comprises a front end surface and an upper end surface, the front end surface is oblique with respect to the upper end surface, and the illumination device is disposed on the front end surface.

18. The power tool according to claim 16, wherein the power tool is a rotary tool.

19. The power tool according to claim 16, wherein the power tool is an impact tool.

20. The power tool according to claim 16, wherein a number of the plurality of chip-on-board light emitting diodes is four.

* * * * *